Figure 1:
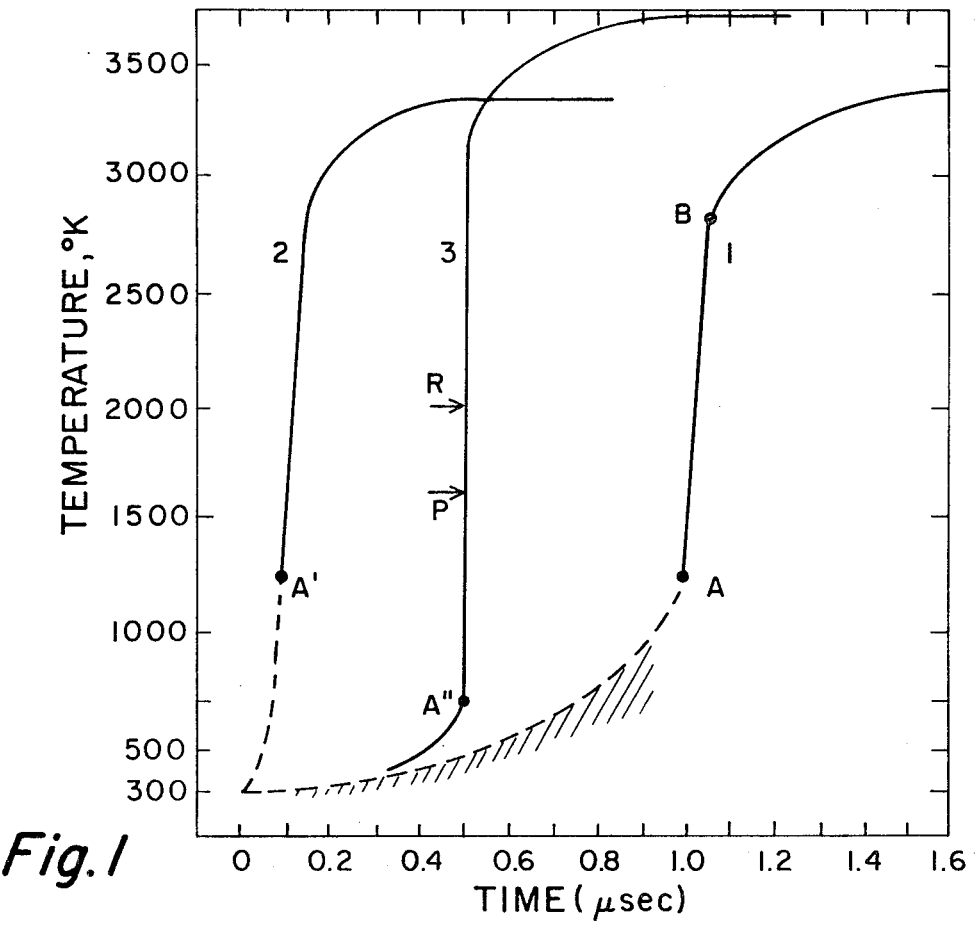

United States Patent

Jensen et al.

[15] 3,662,280
[45] May 9, 1972

[54] EXPLOSIVELY DRIVEN PULSED CHEMICAL LASER

[72] Inventors: Reed J. Jensen; Walter W. Rice, Jr., both of Los Alamos, N. Mex.

[73] Assignee: The United States of America as represented by the United States Atomic Energy Commission

[22] Filed: Nov. 16, 1970

[21] Appl. No.: 89,888

[52] U.S. Cl. .................................................. 331/94.5
[51] Int. Cl. ............................................... H01s 3/09
[58] Field of Search .................................... 331/94.5

[56] References Cited

OTHER PUBLICATIONS

Spencer et al., " Preliminary Performance of a CW Chemical Laser" Applied Physics Letters, Vol. 16, pp. 235–237, March 15, 1970

Spencer et al.: " Comparison of HF and DF Continuous Chemical Lasers" Applied Physics Letters, Vol. 16, pp. 384–386, May 15, 1970

Primary Examiner—Ronald L. Wibert
Assistant Examiner—Edward S. Bauer
Attorney—Roland A. Anderson

[57] ABSTRACT

Reactions of the type $$QA_x \rightarrow Q + xA$$

$$A + BC \rightarrow AB^* + C$$

where Q, A, B, and C are atoms, are driven by means of a very fast explosive reaction which does not produce the lasing molecule $AB^*$ but rather drives the lasing reaction by providing copious quantities of the atomic species A to undergo the lasing reaction. Provided that a sufficient difference in the binding energies of A's molecular precursor $QA_x$ and BC exists, so that $QA_x$ is selectively dissociated, initiation of a rapid explosive reaction in a gaseous branching chain explosive mixed with $QA_x$ and BC procedures an intense laser pulse in an optical cavity.

9 Claims, 2 Drawing Figures

INVENTORS:
Reed J. Jensen
Walter W. Rice, J.

BY

EXPLOSIVELY DRIVEN PULSED CHEMICAL LASER

The invention described herein was made in the course of, or under, a contract with the U.S. ATOMIC ENERGY COMMISSION. It relates to chemical lasers, and, more particularly, to a method of driving a pulsed chemical lasing reaction by means of an explosive reaction.

Chemical lasers produce laser beam energy from the energy of a chemical reaction. Potentially at least, chemical lasers appear to have the capability of converting large quantities of energy to laser energy more effectively and more efficiently than any other type of laser. They therefore provide a desirable avenue of approach to obtaining powerful pulses of laser energy.

Certain well-known chemical lasing reactions are exchange reactions of the type $$A + BC \rightleftharpoons AB^* + C$$

where A, B, and C are atoms. In order for the lasing reaction to proceed most effectively and efficiently it is essential that large quantities of atomic A be produced within the reaction vessel within a very short time, i.e., about 50 nanoseconds. Furthermore, it is highly desirable that as little as possible of the lasing molecule $AB^*$ be formed before large quantities of A are made available so that self absorption of the AB lasing transition is minimized.

Some form of energy input is necessary to produce large quantities of the atomic species A either from its own molecule, e.g., $A_2$, or from a molecular precursor $QA_x$. This input energy may be provided by means of light energy, electrical energy, chemical energy, or a combination of these. In all chemical lasers heretofore reported, this input energy has been either light or electrical energy. Since for almost all practical purposes, the light energy is produced from electrical systems, these lasers depend on a substantial input of electrical energy to initiate and drive the short-interval production of large amounts of the atomic species necessary to enter into the reaction required to form the lasing molecules. They therefore require a substantial electrical storage or generating capacity. However, a number of projected applications of chemical lasers indicate the desirability of a large, light, simple device, requiring a minimum electrical trigger energy input per unit volume of the laser.

We have now found that this driving energy can be essentially supplied by means of a very fast chemical explosion which does not generate the laser molecule as its reaction product. Only a very small amount of light energy is required to initiate this chemical explosion. Although a number of chemical lasing reactions are explosive in nature it is undesirable—for reasons that will be explained later in this specification—that the explosive driver be the same reaction that produces the laser molecule.

It is therefore an object of this invention to provide a method by which powerful laser pulses can be produced in a chemical laser with a minimum of electrical or light energy input. Another object is to provide a method in which a very fast explosive reaction which does not generate the laser molecule as its reaction product is used to initiate and drive powerful laser pulses in a chemical laser with a minimum of electrical or light energy input. Still another object is to provide a method in which a very rapid explosive reaction is used to generate copious amounts of fluorine atoms which in turn react with molecular hydrogen to produce a powerful laser burst in an HF chemical laser. Yet another object is to provide an explosively driven pulsed HF chemical laser.

These and other objects of this invention will become apparent from the following description read in conjunction with the accompanying drawings, in which:

FIG. 1 provides comparative temperature histories within light driven and explosively driven HF chemical lasers.

Figure 2:
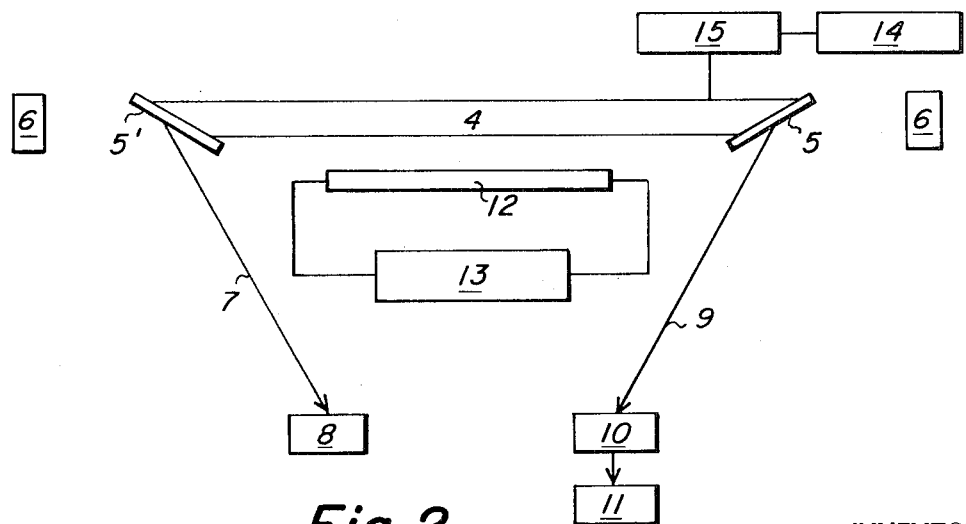

FIG. 2 is a diagrammatic representation of an explosively driven chemical laser.

The HF chemical laser is a promising system for producing powerful laser pulses. It is generally conceived that the chemical system should consist of $H_2$ plus $F_2$ or a fluorine-bearing precursor denoted by the general formula $QF_x$. Optimally, if a simple, light HF laser system capable of producing a powerful pulse is to be attained, a minimum of outside energy should be delivered to the chemical system to produce the pulse, i.e., essentially all of the driving energy should result from stored chemical energy within the chemical system. This in turn requires that a reasonable fraction of the stored chemical energy be available for producing laser gain. In order for the driving energy to be efficacious, it must produce numerous reaction centers within a short time. In the most advantageous case, essentially all of the driving energy goes into dissociating molecular fluorine and providing fluorine atoms which can then enter into chain reactions, thereby exhausting the chemicals present. If these chain reactions occur very rapidly, an intense laser pulse can be readily achieved.

Consider the energy required to dissociate one fluorine bond in a thousand. This, of course, is dependent upon the type of bond involved; however, it is reasonable to assume that the average bonding energy in a typical $QF_x$ compound where Q is any nonmetal atom is 65 kcal/mole. Then the driving energy E required per liter at atmospheric pressure is:

$$E = 65 \frac{\text{kcal.}}{\text{mole}} \times \frac{1}{22.4} \frac{\text{mole}}{l} \times 10^{-3}$$

$$= 2.9 \frac{\text{cal.}}{l} = 12.1 \frac{J}{l}$$

It is apparent that not all of the driving energy theoretically available for dissociating fluorine bonds can be used for this purpose. If the driving process is of the order of 1 percent efficient as is true for flash lamps, the electrical energy required to dissociate one fluorine bond in a thousand is 1.21 kJ per liter. Electrical discharges are probably an order of magnitude more efficient for this purpose, but they have very poor homogeneity in pressure ranges of interest for chemical lasers.

The $H_2 + F_2$ reaction takes place in three stages.

| | |
|---|---|
| $F_2 \rightarrow 2F$ (trigger) | (1) |
| $F + H_2 \rightarrow HF + H$ (propagation) | (2) |
| $H + F_2 \rightarrow HF + F$ (propagation) | (3) |

If a fast, state of the art flash lamp is used to initiate and drive the reaction, it will follow a temperature curve approximating that of curve 1 of FIG. 1, provided it can be made to deposit as much as 12 J/liter as discussed above. Up to point A, the temperature increase is dominated by the driver, although the F atoms as they are formed produce HF molecules which either lase weakly or are collisionally deactivated within a few tenths of a microsecond at reasonable pressures. Around point A the temperature increase and reaction rate are dominated by the reaction itself and continue steeply until the reactants are exhausted (point B). It is clear that a very energetic and rapid driving event is desirable to eliminate a slow buildup. The ultimate temperature attained depends on the exact nature of the initial gas mixture: its chemistry, its diluents, its reaction rates, etc.

Examples of systems having temperature histories similar to curve 1 are $BrF_5 + H_2$ or $ClF_3 + H_2$ driven by the best flash lamp apparatus available. These are known to lase. If the flash lamp could be made to work an order of magnitude faster, it would generate a curve like curve 2 of FIG. 1, where A' is again the point at which the chemical reaction itself begins to dominate. This curve is much better (because it avoids the formation of cold HF in the cross hatched region of curve 1) but still not as good as curve 3.

Curve 3 of FIG. 1 represents explosive driving of an HF laser, an embodiment of this invention. Point A'' represents the point at which the chemical reactions dominate. It is desirable, although not essential, that the fluorine source be a fluoride transparent to optical emission that will initiate a detonation in the driver explosive. The driver explosive is a gaseous, branching chain, non-HF-producing explosive such as, for example, $ClN_3$. A xenon flash lamp readily initiates a detonation in $ClN_3$. The number of reaction centers in this explosive is believed to multiply very rapidly so that curve 3 therefore rises more steeply than curve 1 or curve 2, although no F atoms and consequently no HF is formed until region P is reached at around 1,800° K. The rate of energy development by the $ClN_3$ is very great in this region, and it takes only a few nanoseconds to dissociate the fluoride at which time point R is reached. Because of the branching chain, the shape of the curve in region P-R will not be controlled by just how hard or how fast the triggering energy is delivered. This greatly relaxes the physical requirements of the driver and in principle makes it possible to initiate and drive a very large quantity of premixed laser gas by firing a small flash bulb, turning a valve, or opening a shutter.

It is apparent from all the curves of FIG. 1 that it is extremely desirable to rapidly supply sufficient energy to the reaction mixture such that the atomic fluorine necessary to the lasing reaction is essentially quantitatively generated in the shortest possible time. Should HF be formed as a reaction product of the driver explosive during the early initiation of the explosive reaction, it can be collisionally deactivated, spontaneously radiate, or lase weakly to the ground state. In any of these cases it will reach the ground state very quickly and will itself become an absorber of the laser radiation (i.e., photons) or a collisional deactivator of the upper HF levels during the time the very high energy pulse is sought to be produced. For these reasons, it is undesirable that the lasing molecule be a product of the explosive reaction which supplies the driving energy.

With explosive driving, the only restriction placed on the compound $QF_x$ is that it have a dissociation energy sufficiently different from that of the fuel carrier $H_yC$ that it will dissociate before the fuel carrier. (Here C is any atom forming a gaseous compound with hydrogen and $H_yC$ can represent $HCl$, $HBr$, $H_2S$, $H_3N$, etc.) With this restriction in force, $QF_x$ is dissociated into F atoms while the stronger bond HC persists. These dissociations will occur in steps and if the dissociation energy difference is greater than 10 kcal/mole the $H_yC$ remains present and subject to attack by F atoms as soon as they form. Since $QF_x$ is quantitatively dissociated at temperatures above 1,800° K or so, all the F atoms are available for reaction without any need to rely on chain reactions in HF formation chemistry. This allows the very efficient reactions such as $F + HBr \rightarrow HF + Br$ to be fully utilized.

Explosive driving will be very useful in systems such as $H_2 + Cl_2 \rightarrow 2HCl$ laser where reaction (5) of the propagating reactions produces a ground state product.

$Cl_2 \rightarrow 2Cl$ (trigger)  $\Delta H = +58.8$ kcal/mole  (4)
$Cl + H_2 \rightarrow HCl + H$  $\Delta H = +1$ kcal/mole  (5)
$H + Cl_2 \rightarrow HCl + Cl$  $\Delta H = -44.2$ kcal/mole  (6)

All the laser pumping in this system must come from reaction (6) which has sufficient excess energy to populate the upper laser levels of the HCl molecule. It is easily seen that at least one-half of the HCl molecules are born cold and then participate in absorption of laser energy and collisional deactivation of upper state molecules. Thermal driving avoids this problem according to the following scheme:

$NCl_x \rightarrow N + xCl$ (thermal dissociation)  (7)
$Cl + HBr \rightarrow HCl + Br$ (laser reaction)  (8)

Reaction (8) is known to be efficient, and good laser power should be obtained.

We have used a xenon flash lamp to initiate the explosion of $ClN_3 + NF_3 + H_2$ and $ClN_3 + SF_6 + H_2$. The compounds $NF_3$ and $SF_6$ are known to have very little optical absorption in the spectral region of xenon flash lamps, and, indeed, the binary mixtures $NF_3 + H_2$ and $SF_6 + H_2$ could not be made to react by flash lamp initiation. However, with 12-25 mole percent $ClN_3$ added to these mixtures, a sharp laser pulse is emitted when the mixture is exposed to a xenon flash.

FIG. 2 shows diagrammatically the explosion driven chemical laser system. A quartz laser tube 124 cm long and 21 mm in diameter 4 was fitted with sodium chloride windows 5,5' at the Brewster angle. The laser tube 4 was positioned midway between two totally reflecting, gold surfaced mirrors 6 to 10 m radius of curvature which were 202 cm apart. A portion of the laser flux was reflected out of the cavity by slightly misaligned Brewster angle windows 5,5' affording two convenient beams for monitoring the laser oscillation.

The radiation 7 reflected from one window 5' was focused by a spherical mirror on Au:Ge detector 8. The reflection from the other window 9 was focused on the entrance slits of a 0.5 m monochromator 10 which was fitted with a grating blazed at 9 $\mu$. The HF rotation-vibration transitions were observed in third order using a detector 11 positioned at the exit slits of the monochromator. A 76 cm xenon flash lamp 12 having a standard power supply 13 was positioned against the laser tube to initiate the $ClN_3$ explosion.

The $ClN_3$ was generated by acidifying an aqueous solution containing equimolar concentrations of $NaOCl$ and $NaN_3$ in an explosive generator vessel 14. The gaseous $ClN_3$ was then introduced into the gas handling system 15 where it was mixed with $NF_3 + H_2$ or $SF_6 + H_2$ in the ratios desired. These mixtures were then transferred to laser tube 4 and the $ClN_3$ detonation initiated by means of xenon lamp 12.

The $ClN_3 + NF_3 + H_2$ mixtures were fired at several molar ratios: $1ClN_3/1NF_3/6H_2$, $1ClN_3/2NF_3/5H_2$, $2ClN_3/2NF_3/4H_2$, and $3ClN_3/1NF_3/4H_2$. The most successful results were obtained from the 2/2/4 ratio at pressures between 12 and 24 torr. The laser transitions observed under these conditions are listed in Table I.

A $ClN_3 + SF_6 + H_2$ mixture at 24 mole percent $ClN_3$, 19 mole percent $SF_6$, and 57 mole percent $H_2$ was also fired successfully at a total pressure of 20 torr. A major problem with the $SF_6$ system is that the reaction deposits an abundance of sulfur throughout the laser tube which necessitates swabbing the tube out between shots.

The $ClN_3$ absorption spectrum in the near-ultraviolet overlaps the emission spectrum of the xenon flash lamp, so that the highly exothermic reaction $ClN_3 + h\nu \rightarrow \frac{1}{2} Cl_2 + 3/2\ N_2\ \Delta H = -93.2$ kcal/mole is initiated, producing temperatures of several thousand degrees K. During the explosion of the tertiary mixtures, the $NF_3$ or $SF_6$ is substantially dissociated into F atoms allowing the reaction $F + H_2 \rightarrow HF + H\ \Delta H = -31.6$ kcal/mole ($E_A = 1.7$ kcal/mole) to populate the 0th, 1st, 2nd, and 3rd vibrational levels of HF (see Table II).

TABLE I

HF Laser Lines Observed in a $2ClN_3/2NF_3/4H_2$ Molar Ratio Mixture

| $2 \rightarrow 1$ | $3 \rightarrow 2$ | $4 \rightarrow 3$ |
|---|---|---|
| | $P_3(5)$ | $P_4(5)$ |
| $P_2(6)$ | $P_3(6)$ | $P_4(6)$ |
| $P_2(7)$ | $P_3(7)$ | |
| $P_2(8)$ | $P_3(8)$ | |
| $P_2(9)$ | | |

TABLE II

Energy Needed for Population of Vibrationally Excited States

| Vibrational Transition | Band Origin in $cm^{-1}$ | Band Origin in kcal/mole |
|---|---|---|
| $0 \rightarrow 1$ | 3961.6 | 11.3 |
| $0 \rightarrow 2$ | 7751.0 | 22.2 |
| $0 \rightarrow 3$ | 11373.0 | 32.5 |
| $0 \rightarrow 4$ | 14831.9 | 42.4 |

It will be apparent to one of reasonable skill in the art that what has been disclosed is a pulsed chemical laser in which chemical energy is converted to laser energy with a minimum of energy input from outside the laser system. It will be further apparent that explosively driven pulsed chemical lasers of the type herein disclosed may readily be scaled up in size to produce very intense pulses of laser energy with a minimum of auxiliary power storage or generating equipment, because the driving energy is supplied from chemical energy stored within the system. Finally, those of reasonable skill in the art will realize that explosively driven pulsed chemical lasers are not limited to those disclosed by example herein but may comprise any chemical system wherein the explosive reaction generates a time-temperature curve similar to that of curve 3 of FIG. 2 and wherein the dissociation energies are sufficiently disparate to allow formation of large quantities of an atomic species for use in a lasing reaction without simultaneously dissociating the molecular species which takes part in the lasing reaction.

We claim:

1. A method of producing an intense laser pulse through reactions of the type $$QF_x \xrightarrow{\Delta} Q + xF$$
$$F + HC \rightarrow HF^* + C$$

where Q, F, H, and C are atoms, Q is bromine, chlorine, nitrogen, or sulfur, H is hydrogen, F is fluorine, and C is hydrogen, chlorine, bromine, sulfur or nitrogen, comprising selectively and substantially completely dissociating $QF_x$ in a gas mixture comprising $QF_x$, HC, and a branching chain explosive by initiating a rapid explosive reaction in said explosive, said explosive generating no HF as a reaction product, and said gas mixture being in an optical cavity.

2. The method of claim 1 wherein Q is sulfur or nitrogen, and HC is $H_2$, $HCl$, $HBr$, $H_2S$ or $H_3N$.

3. The method of claim 2 wherein $QF_x$ is $SF_6$ and HC is $H_2$.

4. The method of claim 3 wherein said gas mixture is 24 mole percent $ClN_3$, 19 mole percent $SF_6$, and 57 mole percent $H_2$.

5. The method of claim 2 wherein $QF_x$ is $NF_3$ and HC is $H_2$.

6. The method of claim 5 wherein said explosive is $ClN_3$ and said explosive comprises 12 to 25 mole percent of said gas mixture.

7. The method of claim 6 wherein said gas mixture comprises 25 mole percent $ClN_3$, 25 mole percent $NF_3$, and 50 mole percent $H_2$, and wherein the pressure of said gas mixture is in the range of 12 to 24 torr.

8. The method of claim 1 wherein said rapid explosive reaction is initiated by optical radiation.

9. The method of claim 8 wherein the optical radiation used to initiate said explosive reaction is in a spectral range to which $QF_x$ and HF are essentially transparent.

* * * * *